Nov. 11, 1952  E. J. HANSLIK  2,617,614
LEADER BOX AND DISPENSER
Filed Feb. 8, 1950
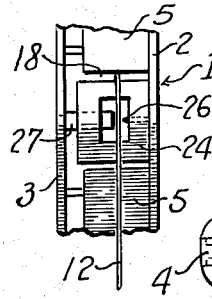
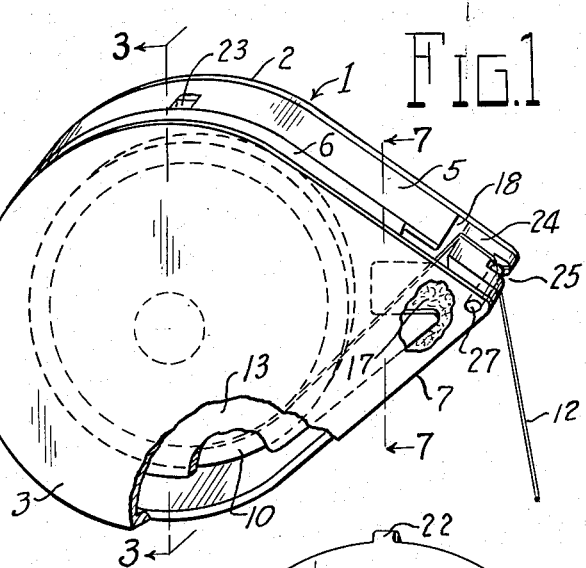
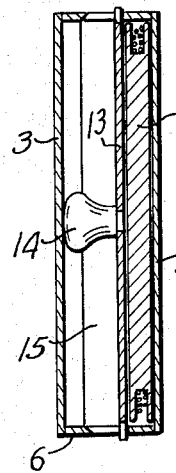
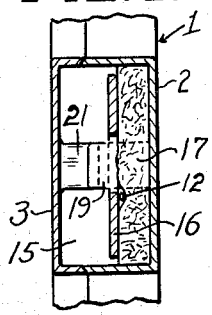
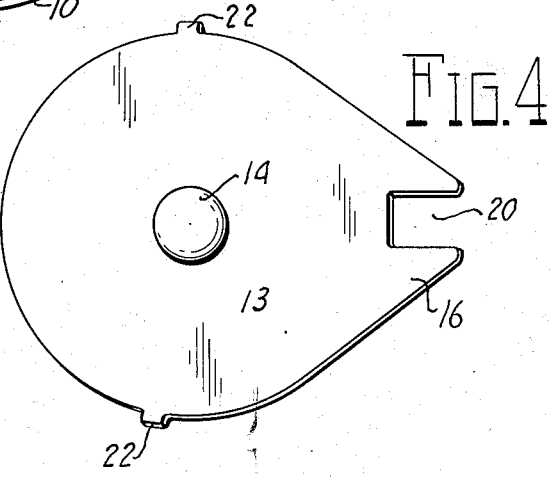
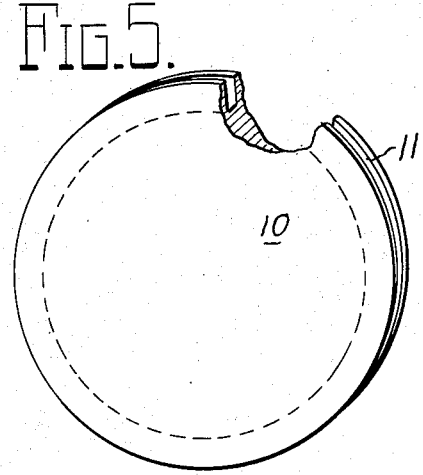
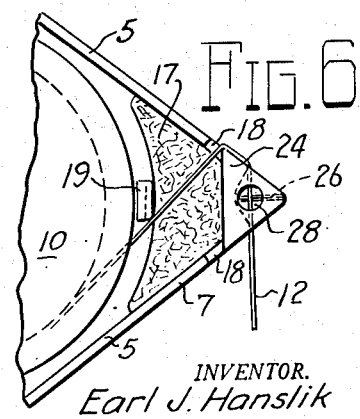
INVENTOR.
Earl J. Hanslik
BY Owen & Owen
ATTORNEYS Patented Nov. 11, 1952

2,617,614

UNITED STATES PATENT OFFICE 2,617,614

LEADER BOX AND DISPENSER

Earl J. Hanslik, Toledo, Ohio

Application February 8, 1950, Serial No. 143,056

3 Claims. (Cl. 242—142)

1

This invention relates to a line dispensing means, and primarily to a box for holding and dispensing a leader line and severing such line into sections of desired length when dispensed.

An object of the invention is the provision of a box of this character that is simple and inexpensive in construction and is capable of efficiently holding a supply of line in spool wound form and permitting its easy dispensing by withdrawal of desired lengths from the box and is then easily and quickly operable to sever the withdrawn length.

Another object of the invention is the provision in a device of this character of a simple and efficient form of severing means for a withdrawn length of line together with means for frictionally resisting withdrawal of a line from the box and also yieldingly holding a projected box end portion of a line, after severing occurs, in exposed position for a convenient grasping preparatory to withdrawing the next length of line from the box for severing.

Further objects and advantages of the invention will be apparent from the following detailed description, and from the accompanying drawings illustrating one embodiment thereof, in which—

Fig. 1 is a perspective view of a device embodying the invention; Fig. 2 is a fragmentary edge view of the line dispensing portion thereof; Fig. 3 is a section on the line 3—3 in Fig. 1; Fig. 4 is a perspective view of the pressure plate within the box; Fig. 5 is a perspective view of a spool used in connection with the dispenser, with a part broken away; Fig. 6 is a fragmentary view of the portion of the device from which the line is dispensed and severed, with the box cover removed, and Fig. 7 is a section on the line 7—7 in Fig. 1.

Referring to the drawings, 1 designates a box of shallow flat form and comprising a body 2 and a cover 3 hinged together at 4. The body 2 has a marginal side wall or flange 5 with which a similar but more shallow edge flange 6 of the cover edgewise abuts. The box in plan is generally of tear shape, being circular at its hinged edge and having its opposite edge forming a triangular projecting part 7. This part, in the present instance, is formed by continuing the opposing edge walls at the projecting side of the box tangentially in converging relation until they meet at a point.

A spool 10 of thin disk-form with a peripheral groove 11, in which a leader line 12 is wound, is disposed in the box 1 flatwise against its bottom and is frictionally held therein against free turning by a partition plate 13 bearing against its side. This plate is provided centrally with a knob 14 to facilitate removal from the box, and pressure against this knob by the cover 3, when closed, holds the plate yieldingly pressed against the spool in opposition to the box bottom. The space 15 at the outer side of the plate 13 may be utilized for holding leaders with flies and hooks attached, small rolls of leader line, etc.

The plate 13 corresponds in shape to the tear shape of the box and has its projecting end portion 16, which corresponds to the box projection 7 and fits therein, bearing against a registering pad 17 of felt-like material on the box bottom within said portion 7. The free end of the line 12 is intended to project outward from the spool between the plate projection 16 and the pad 17 and thence out through an edge opening 18 in the edge wall 5 of the box body. The line is thus yieldingly held in projected position to permit grasping and pulling from the box.

A catch lug 19 projects up from the bottom of the box through a notch or opening 20 in the plate 13 and is yieldingly engaged by a companion catch 21 on the inner side of the cover 3 when the box is closed. The plate 13 is provided on its opposite side edges with spurs 22 that engage in registering notches 23 in the edge flange 5 of the box body.

The bottom of the box body 1 is provided at the apex end of its triangular extension part 7 with a boss 24 of corresponding triangular form and this is spaced from one or both ends of the side wall 5 to form one or more openings 18 through which the line may pay out. The apex end of this boss is cross-notched at 25, and in one side of this notch is set a knife 26 with its cutting edge extending into the notch, as best shown in Fig. 2. An anvil pin 27 is projected into the notch through an opening 28 in its other side wall for axial movement toward and away from the knife edge. The outer end of this pin is attached to the apex end of the cover part. This part is made flexible with respect to the boss 24 by omitting the cover edge flange 6 therefrom to permit such part to be sprung inward by pressure from without and thus force the anvil pin inward against the knife edge to sever a line therebetween. This pressure may be easily and quickly applied by grasping the projected end of the box between the thumb and fingers of a hand and squeezing inward thereon.

The present dispensing means provides a simple and efficient means for enabling a length of line to be payed out from the spool and severed in desired lengths and to be held against withdrawal into the box after severing. These features make the device particularly valuable for use in the handling of lines of nylon or similar material which are now frequently used.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a device of the class described, a box having opposing top and bottom portions in substantially parallel relation and forming a cavity for receiving a line pay-out spool, said box having its bottom and cover extended at one side of the cavity transverse to the axis of a contained spool and having a line pay-out opening between said extended portions, one at least of said extensions being resilient and compressible relative to the other, a boss on the inner side of the extended portion of one of said bottom and cover parts having a notch therein and a knife edge in said notch and an opening opposing said knife edge, an anvil pin projecting from the other of said bottom and cover parts to which the boss is connected and movable in the boss against said knife edge to sever a line therebetween, the portions of said bottom and cover parts that carry said boss and pin being yieldingly movable from normal position by external pressure to relatively move the pin and knife edge to severing relation.

2. An arrangement as called for in claim 1, together with pressure means within the box adjacent to said opening and through which a line paying out from the spool passes and which exerts a yielding pressure on a line to resist inward or outward movements thereof relative to said opening.

3. In a device of the class described, a box for holding a spool in which a line is wound and in which the spool may have line unwinding movements, said box having opposed side walls at the sides of a contained spool and a rim connecting the side walls, said side walls each having an edge extension in opposed relation to the other and at least one of said extensions being resilient and free for compression movements toward the other, said rim having a pay-out opening between said side wall extensions, and cooperating line severing parts carried in opposed relation by said extensions and operable to sever a line adjacent to the pay-out opening when said extensions are relatively compressed.

EARL J. HANSLIK.

REFERENCES CITED

The following references are of record in the file of this patent:

UNITED STATES PATENTS

| Number | Name | Date |
|---|---|---|
| Re. 9,605 | Palmer | Mar. 15, 1881 |
| 192,038 | Waterbury | June 12, 1877 |
| 490,078 | Marvin | Jan. 17, 1893 |
| 633,404 | Warburton | Sept. 19, 1899 |
| 781,217 | Mildeberger | Jan. 31, 1905 |
| 1,050,118 | Farrell | Jan. 14, 1913 |
| 1,805,619 | Fuller | May 19, 1931 |
| 2,473,072 | Plouff | June 4, 1949 |

FOREIGN PATENTS

| Number | Country | Date |
|---|---|---|
| 335,490 | Germany | Apr. 5, 1931 |